US009201504B2

(12) United States Patent
Gohng et al.

(10) Patent No.: US 9,201,504 B2
(45) Date of Patent: Dec. 1, 2015

(54) VEHICULAR GLANCE LIGHTING APPARATUS AND A METHOD FOR CONTROLLING THE SAME

(75) Inventors: Jun-Ho Gohng, Seongnam-si (KR); Dae Woo Kwon, Ansan-si (KR); Moon Soo Park, Gunpo-si (KR); Chang Kyu Han, Seoul (KR)

(73) Assignee: DAESUNG ELECTRIC CO., LTD., Gyeonggi-Do (KR)

( * ) Notice: Subject to any disclaimer, the term of this patent is extended or adjusted under 35 U.S.C. 154(b) by 468 days.

(21) Appl. No.: 13/458,969

(22) Filed: Apr. 27, 2012

(65) Prior Publication Data
US 2012/0326967 A1 Dec. 27, 2012

Related U.S. Application Data

(63) Continuation-in-part of application No. 12/141,755, filed on Jun. 18, 2008, now Pat. No. 8,358,279.

(30) Foreign Application Priority Data

Nov. 29, 2007 (KR) ........................ 10-2007-0123104
Mar. 21, 2008 (KR) ........................ 10-2008-0026626
Mar. 30, 2012 (KR) ........................ 10-2012-0033405

(51) Int. Cl.
*B60W 50/08* (2012.01)
*G06F 3/01* (2006.01)
(Continued)

(52) U.S. Cl.
CPC ................ *G06F 3/016* (2013.01); *B60K 35/00* (2013.01); *B60K 37/06* (2013.01); *B60W 50/14* (2013.01); *B60W 50/16* (2013.01); *B60K 2350/102* (2013.01); *B60K 2350/108* (2013.01);
(Continued)

(58) Field of Classification Search
CPC .................... G06F 3/016; B60W 2050/146
USPC .................. 345/156, 173; 701/30, 41
See application file for complete search history.

(56) References Cited

U.S. PATENT DOCUMENTS

| 4,803,362 A | 2/1989 | Butts |
| 6,198,409 B1 * | 3/2001 | Schofield et al. ............. 340/903 |

(Continued)

FOREIGN PATENT DOCUMENTS

| CN | 1811538 A | 8/2006 |
| JP | 64-022011 | 1/1989 |

(Continued)

*Primary Examiner* — Amare Mengistu
*Assistant Examiner* — Joseph G Rodriguez
(74) *Attorney, Agent, or Firm* — Rabin & Berdo, P.C.

(57) ABSTRACT

The present invention provides a vehicular glance lighting apparatus which provides a driver with vehicle-running information as light of a background screen and includes a driver attention function through prompt information delivery such that the driver visually recognizes as a background screen the vehicle-running information needed essentially or minimally for running the vehicle without requiring the driver's attention to avoid dissipation of the driver's sight, thereby preventing the driver's driving attention from being diverted, and a method for controlling the same. The vehicle-running information related with the running of a vehicle to be outputted in the form of light as a background screen, so that a driver can perceive the vehicle-running information without diverting or obstructing the driver's driving attention, thereby enhancing the driver's ability to cope with a vehicle travel risk during the traveling of the vehicle.

12 Claims, 10 Drawing Sheets

(51) Int. Cl.
*B60K 35/00* (2006.01)
*B60K 37/06* (2006.01)
*B60W 50/16* (2012.01)
*B60W 50/14* (2012.01)

(52) U.S. Cl.
CPC . *B60K2350/1016* (2013.01); *B60K 2350/1024* (2013.01); *B60K 2350/1028* (2013.01); *B60K 2350/1048* (2013.01); *B60W 2050/146* (2013.01); *B60W 2550/302* (2013.01); *B60W 2550/308* (2013.01)

(56) References Cited

U.S. PATENT DOCUMENTS

| | | | |
|---|---|---|---|
| 6,907,328 B2* | 6/2005 | Fehr et al. | 701/29.1 |
| 7,385,588 B2 | 6/2008 | Phillips et al. | |
| 7,987,030 B2 | 7/2011 | Flores et al. | |
| 2003/0092384 A1* | 5/2003 | Ross, III | 455/41 |
| 2004/0012560 A1 | 1/2004 | Jasso et al. | |
| 2005/0099279 A1* | 5/2005 | Forbes et al. | 340/435 |
| 2005/0195383 A1* | 9/2005 | Breed et al. | 356/4.01 |
| 2006/0170700 A1 | 8/2006 | Hoelscher et al. | |
| 2006/0255683 A1 | 11/2006 | Suzuki et al. | |
| 2006/0279554 A1 | 12/2006 | Shin et al. | |
| 2007/0021915 A1* | 1/2007 | Breed et al. | 701/301 |
| 2007/0081262 A1* | 4/2007 | Oizumi et al. | 359/843 |
| 2007/0150134 A1* | 6/2007 | Yamamoto | 701/30 |
| 2007/0229394 A1* | 10/2007 | Ishikawa et al. | 345/7 |
| 2008/0023254 A1* | 1/2008 | Prost-Fin et al. | 180/400 |
| 2009/0140993 A1 | 6/2009 | Han et al. | |
| 2011/0284304 A1 | 11/2011 | Van Schoiack | |
| 2012/0326967 A1* | 12/2012 | Gohng et al. | 345/156 |

FOREIGN PATENT DOCUMENTS

| | | |
|---|---|---|
| JP | H02-242118 A | 9/1990 |
| JP | 06-004941 A | 1/1994 |
| JP | 2003-281972 A | 10/2003 |
| JP | 2003-295959 A | 10/2003 |
| JP | 2008-269580 A | 11/2008 |
| JP | 2008-273376 A | 11/2008 |
| JP | 2011-159278 A | 8/2011 |
| KR | 2004-0044075 A | 5/2004 |
| KR | 2006-0036710 A | 5/2006 |
| KR | 10-2012-0007834 A | 1/2012 |
| WO | WO-2011/108091 A1 | 9/2011 |

* cited by examiner

VEHICULAR GLANCE LIGHTING APPARATUS AND A METHOD FOR CONTROLLING THE SAME

CROSS-REFERENCE TO RELATED APPLICATIONS

The present application is related to a patent application which has been filed by the same Applicant, i.e., U.S. Utility patent application entitled "SENSATION SYSTEM" filed on Jun. 18, 2008, and bearing a Ser. No. 12/141,755. Also, This application claims the benefit of Korean Patent Application No. 10-2012-0033405, filed on Mar. 30, 2012 in the Korean Intellectual Property Office, which is incorporated herein by reference in its entirety.

BACKGROUND OF THE INVENTION

1. Field of the Invention

Exemplary embodiments of the present invention relate to an interface apparatus which outputs vehicle-running information in the form of light as a background screen without obstructing a driver's field of vision.

2. Background of the Related Art

An automobile is utilized as a universal daily convenience system that is provided with a variety of convenience equipment beyond a simple means of transport. A conventional automobile employed a display device so as to provide a driver with vehicle-running information, for example, information on vehicle safety, or/and the operational state of convenience equipment such as an air conditioning unit, etc., of a vehicle.

Particularly, the automobile is equipped with electrical and electronic devices such as LCD displays that output character or icon type information to provide various items of information of vehicles to drivers. In addition, a head-up display is produced or researched which directly presents character or icon type information over a windshield of a vehicle in order to reduce diversion of a driver's driving attention. However, since such display devices display characters or icons that are subdivided to ultimately provide information to the driver, the driver is required to directly gaze at the characters or icons. The driver requires considerable time recognizing the characters or icons being displayed while maintaining the driver's driving attention. In other words, the driver spends significant time perceiving the characters or icons visually and recognizing them in his or her brain. In particular, diversion of the driver's driving attention for several seconds during high speed traveling of the vehicle is regarded as a considerable risk factor for the safety of a vehicle.

SUMMARY OF THE INVENTION

Accordingly, the present invention has been made in order to solve the above-mentioned problems occurring in the prior art, and it is an object of the present invention to provide a vehicular glance lighting apparatus which provides a driver with vehicle-running information as light of a background screen and includes a driver attention function through prompt information delivery such that the driver visually recognizes as a background screen the vehicle-running information needed essentially or minimally for running the vehicle without requiring the driver's attention to avoid dissipation of the driver's sight, thereby preventing the driver's driving attention from being diverted, and a method for controlling the same.

To achieve the above objects, in one aspect, the present invention provides a vehicular glance lighting apparatus, including: an input unit configured to generate an input signal that can be manipulated by a driver of a vehicle; a vehicle-sensing unit configured to detect vehicle sensing information including vehicle safety information for the running of the vehicle; a storage unit configured to store vehicle reference information including safety reference information for determining the vehicle running safety; a control unit electrically connected to the input unit, the vehicle-sensing unit, and the storage unit, and configured to provide the driver with vehicle-running information based on the vehicle sensing information of the vehicle-sensing unit and the vehicle reference information of the storage unit; and a glance light unit disposed at a position beyond the driver's driving view range needing a driving attention while being located within the vehicle driver's view range, and configured to output light corresponding to the vehicle-running information in response to a glance light control signal from the control unit to allow the vehicle driver to intuitively perceive information of light while maintaining the driver's driving attention.

In the vehicular glance light apparatus, the vehicle-sensing unit comprises a vehicle indoor temperature sensor, and the vehicle sensing information further comprises vehicle air conditioning information including the indoor temperature of the vehicle.

In the vehicular glance light apparatus, the vehicle-sensing unit comprises an inter-vehicle distance sensor configured to detect the distance between the driver's vehicle and a front-running vehicle during the traveling of the driver's vehicle, and the vehicle safety information comprises front-running vehicle distance information outputted from the inter-vehicle distance sensor.

In the vehicular glance light apparatus, the vehicle-sensing unit comprises a lane image sensor configured to detect a lane status during the traveling of the driver's vehicle, and the vehicle safety information comprises lane sensing information outputted from the lane image sensor.

In the vehicular glance light apparatus, the vehicle-sensing unit comprises a dead zone obstacle sensor configured to detect whether or not an obstacle exists in a side dead zone of the driver's vehicle and the relative speed between the driver's vehicle and the obstacle, and the vehicle safety information comprises information on whether or not the obstacle exists in the side dead zone and information on the relative speed, which are outputted from the dead zone obstacle sensor In the vehicular glance light apparatus, the glance light unit comprises: a front inner glance light disposed at a dashboard of the driver's vehicle; and a side inner glance light disposed at a front pillar of the driver's vehicle.

In the vehicular glance light apparatus, the glance light unit further comprises a side view glance light disposed at an end of a sideview mirror of the driver's vehicle so as to oriented toward the driver.

In the vehicular glance light apparatus, the glance light unit further comprises a steering wheel rim glance light disposed at a rim of the steering wheel of the driver's vehicle.

In another aspect, the present invention provides a method for controlling a vehicular glance light apparatus, wherein the method includes: an apparatus providing step of providing a vehicular glance light apparatus including an input unit configured to generate an input signal that can be manipulated by a driver of a vehicle, a vehicle-sensing unit configured to detect vehicle sensing information including vehicle safety information for the running of the vehicle, a storage unit configured to store vehicle reference information including safety reference information for determining the vehicle running safety, a control unit electrically connected to the input unit, the vehicle-sensing unit, and the storage unit, and configured to provide the driver with vehicle-running information based on the vehicle sensing information of the vehicle-sensing unit and the vehicle reference information of the storage unit, and a glance light unit disposed at a position beyond the driver's driving view range needing a driving attention while being located within the vehicle driver's view range, and configured to output light corresponding to the vehicle-running information in response to a glance light control signal from the control unit to allow the vehicle driver to intuitively perceive information of light while maintaining the driver's driving attention; a sensing step of allowing the vehicle-sensing unit to detect vehicle sensing information including vehicle safety information in response to a sensing control signal from the control unit; a mode-setting step of allowing the glance light unit to set an operating mode according to the vehicle-running information to be provided to the driver based on the vehicle sensing information of the vehicle-sensing unit and the vehicle reference information of the storage unit; and a mode executing step of allowing the control unit to output the glance light control signal to the glance light unit according to the operating mode set in the mode-setting step.

In the method for controlling a vehicular glance light apparatus, the mode-setting step comprises: a sensed information processing step of processing the vehicle sensing information of the vehicle-sensing unit detected in the sensing step and extracting changes in the processed vehicle sensing information; a safety information change determination step of determining whether or not there is a change in the vehicle safety information among the changes in the vehicle sensing information extracted in the sensed information processing step, a mode selecting step of selecting any one of a safety mode and a convenience mode based on a determination result in the safety information change determination step.

In the method for controlling a vehicular glance light apparatus, the vehicle-sensing unit comprises an inter-vehicle distance sensor configured to detect the distance between the driver's vehicle and a front-running vehicle during the traveling of the driver's vehicle, a lane image sensor configured to detect a lane status during the traveling of the driver's vehicle, a dead zone obstacle sensor configured to detect whether or not an obstacle exists in a side dead zone of the driver's vehicle and the relative speed between the driver's vehicle and the obstacle, and a steering angle sensor configured to detect the rotational angle of the steering wheel of the driver's vehicle, wherein the vehicle safety information comprises front-running vehicle distance information outputted from the inter-vehicle distance sensor, lane sensing information outputted from the lane image sensor, and information on whether or not the obstacle exists in the side dead zone and information on the relative speed, which are outputted from the dead zone obstacle sensor, and wherein the safety mode comprises a cruise warning mode of warning a driver of the safety distance between the driver's vehicle and the front-running vehicle, a lane departure warning mode of warning the driver of whether or not the driver's vehicle departs a lane during the traveling of the driver's vehicle, and a dead zone warning mode of warning the driver of not only whether or not an obstacle exists at a side of the vehicle but also the relative speed between the driver's vehicle and another vehicle as the obstacle.

In the method for controlling a vehicular glance light apparatus, the vehicle reference information previously stored in the storage unit comprises a minimum safety distance (dmax) indicating a minimum safety distance between the driver's vehicle and a front-running vehicle, a minimum steering angle (θ) for determining whether or not the driver steers the steering wheel, and preset glance light information including color information preset in response to the vehicle sensing information or light outputting period information, and wherein a step of setting the safety mode comprises: an inter-vehicle distance-comparing step of comparing the front-running vehicle distance information with the minimum safety distance; a steering intention determining step of, if it is determined that the front-running vehicle distance information exceeds the minimum safety distance, comparing a steering angle of the driver's vehicle steering wheel with a minimum steering angle and determining the operational state of a turn indicator of the vehicle; and a the dead zone obstacle-determining step of, if it is determined that the steering angle of the driver's vehicle steering wheel exceeds the minimum steering angle and the vehicle is steered in the operating direction of the turn indicator in the steering intention determining step, determining whether or not an obstacle exits at a side of the driver's vehicle in the steering direction of the driver's vehicle.

BRIEF DESCRIPTION OF THE DRAWINGS

The above and other objects, features and advantages of the present invention will be apparent from the following detailed description of the preferred embodiments of the invention in conjunction with the accompanying drawings, in which.

EXPLANATION ON SYMBOLS

Figure 1:
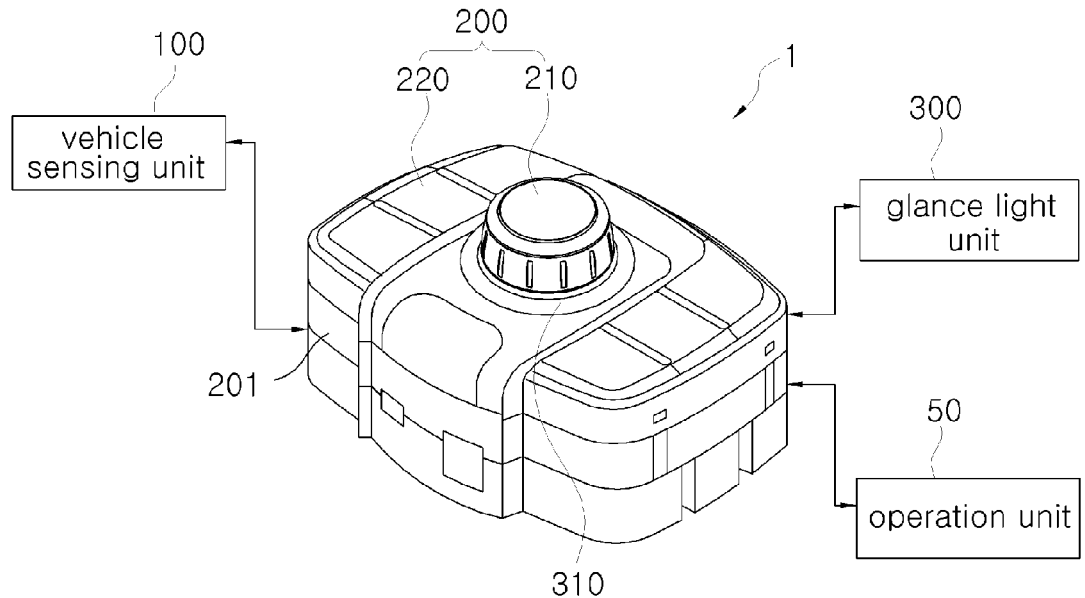
FIG. 1 is a schematic diagrammatic view illustrating a vehicular glance lighting apparatus in accordance with an embodiment of the present invention.

10: vehicular glance lighting apparatus
20: control unit
30 . . . storage unit
40: arithmetic logic unit
100: vehicle-sensing unit
200: input unit
300: glance light unit

DETAILED DESCRIPTION OF THE PREFERRED EMBODIMENTS

Reference will be now made in detail to preferred embodiments of the present invention with reference to the attached drawings. In the following description, the detailed description on known function and constructions unnecessarily obscuring the subject matter of the present invention will be avoided hereinafter. Also, the terms used herein are defined in consideration of the function of the present invention, which may vary according to an intention of a user or an operator or according to custom.

Now, a vehicular glance lighting apparatus and a method for controlling the same according to a preferred embodiment of the present invention will be described hereinafter in more detail with reference to the accompanying drawings.

A vehicular glance lighting apparatus 10 according to an embodiment of the present invention is mounted at a vehicle and provides vehicle-running information in the form of light to give safety or convenience in vehicle running to a driver using vehicle sensing information including vehicle safety information regarding the running of a current vehicle.

The vehicular glance lighting apparatus 10 includes an input unit 200, a vehicle-sensing unit 100, a storage unit 30, a control unit 20, and a glance light unit 300. The vehicular glance lighting apparatus 10 provides a driver with vehicle-running information based on a signal from the input unit 200 or the vehicle-sensing unit 100.

The input unit 200 generates an input signal that can be manipulated by a vehicle driver. In this embodiment, the input unit 200 is implemented as a unit console type disposed at a center pascia (see FIG. 3) of the vehicle, but may be modified in various manners depending on a design specification, such as being disposed at a vehicle steering wheel. The input unit 200 according to this embodiment includes a console housing 201. The detailed elements of the input unit 200 may be movably mounted at the console housing 201. The input unit 200 includes a rotary switch 210 implemented as a rotary switch type and a button switch 220 implemented as a push button type. The input unit 200 may be modified in various manners within a range of providing a predetermined input signal to the control unit through a driver's manipulation input. An encoder type angle sensor is disposed at a lower portion of the rotary switch 210, and the rotational state of a rotary knob of the rotary switch 210, which is applied by the driver, can be transferred to the control unit 20 through the rotary switch 210. The button switch 220 may be implemented as a push switch type tact switch. A change in electrical signals of the rotary switch 210 an/or the button switch 220 can be transferred to the control unit 20 through the console type vehicular glance lighting apparatus 10 at which the input unit or a part of the glance light unit is disposed. In this embodiment, the rotary switch may perform a predetermined haptic function by including an electric motor inside the console housing 201. An operating signal by a driver's manipulation and selection through the input unit including the rotary switch and the button switch is transferred to the operation unit 50 through the control unit 20. The operation unit 50 may include various kinds of convenience equipment included in the vehicle, such as an air conditioning unit 51 and a navigation unit 53.

Figure 2:
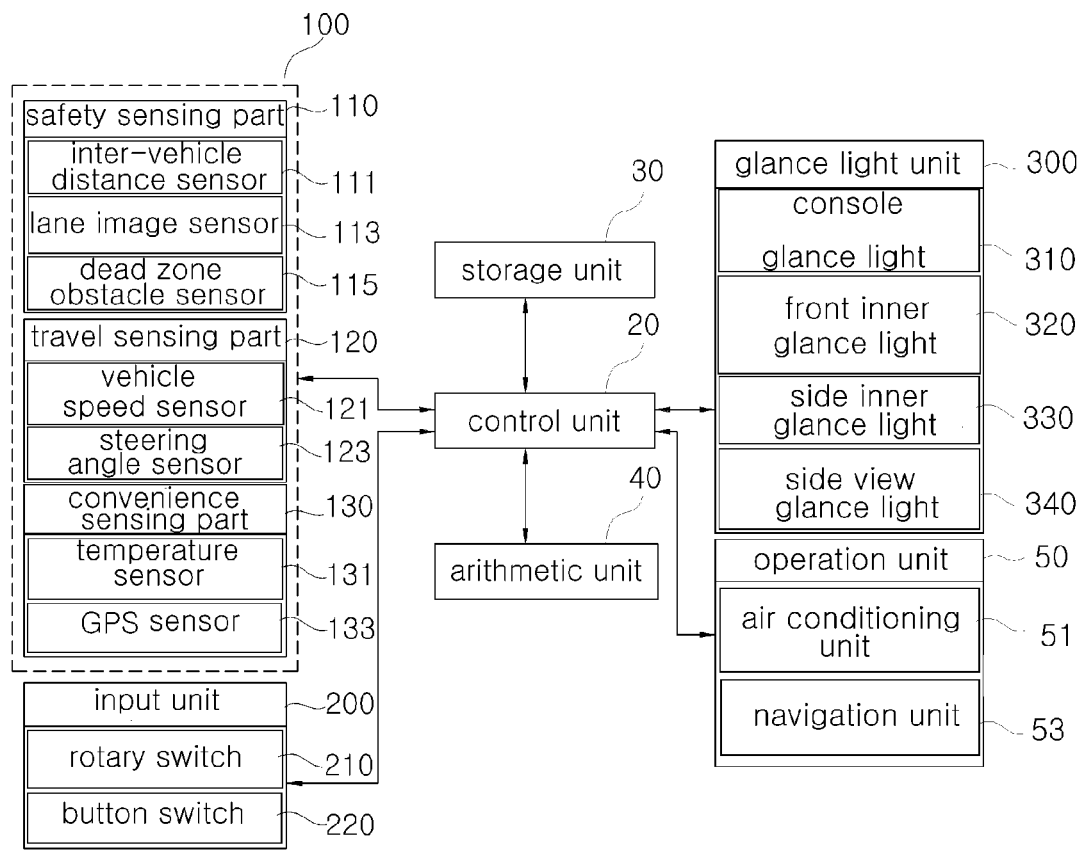
FIG. 2 is a schematic block diagram illustrating the construction of a vehicular glance lighting apparatus in accordance with an embodiment of the present invention.

The vehicle-sensing unit 100 detects vehicle sensing information including vehicle safety information for the running of the vehicle. As shown in FIG. 2, the vehicle-sensing unit 100 includes a safety sensing part 110, a travel sensing part 120, and a convenience sensing part 130. The safety sensing part 110 acquires vehicle sensing information of vehicle safety information associated with the traveling safety of the vehicle, the travel sensing part 120 acquires vehicle sensing information of vehicle travel information, and the convenience sensing part 130 acquires vehicle sensing information for utilization of vehicle-related convenience equipment, and the like.

The safety sensing part 110 includes an inter-vehicle distance sensor 111, a lane image sensor 113, and a dead zone obstacle sensor 115. The inter-vehicle distance sensor 111 detects the relative distance between a driver's vehicle and a counterpart vehicle that travels ahead of the driver's vehicle during the traveling of the driver's vehicle. The inter-vehicle distance sensor 111 can be implemented as a laser sensor or a supersonic sensor. The lane image sensor 113 is disposed at a lower end of a sideview mirror (not shown) or at a side of the vehicle and acquire a road surface image during the traveling of the vehicle, i.e., an image of a road surface including a lane during the traveling of the vehicle. The lane image sensor 113 may be implemented as a CCD camera, or the like. The dead zone obstacle sensor 115 is disposed at a side or a side-rear portion of the vehicle and can detect not only whether or not there is an obstacle, i.e., a counterpart vehicle in a dead zone region which is difficult for a driver to visually perceive, but also the relative distance or the relative speed between the driver's vehicle and the counterpart vehicle. The dead zone obstacle sensor 115 may be implemented as a laser sensor or a suersonic sensor.

The travel sensing part 120 is a vehicle sensing part that acquires vehicle sensing information associated with the traveling of the vehicle, and may include a vehicle speed sensor 121, and a steering angle sensor 123 or a crank position sensor (not shown) of a vehicle engine. Whether a vehicle travels or the traveling speed of the vehicle can be detected through the vehicle speed sensor 121 or the crank position sensor (not shown) of the travel sensing part. The steering angle sensor 123 is connected to a steering wheel of the vehicle and detects the rotational angle or the rotational speed of the steering wheel by the driver such that the steering angle currently generated by the driver or whether the steering wheel is steered by the driver can be sensed.

The convenience sensing part 130 is a vehicle sensing part that detects the state or the input associated with applications of the vehicle. The convenience sensing part 130 may include a temperature sensor 131 associated with an air conditioning unit of the vehicle and a GPS sensor that detects the absolute position of the vehicle. The temperature sensor 131 detects the indoor temperature of the vehicle so as to be utilized upon the control of the air conditioning unit 51. The GPS sensor 133 detects the absolute position of the vehicle such that vehicle sensing information can be acquired which is utilizable when the operation of the operation unit such as a navigation unit 53 is performed.

The storage unit 30 is electrically connected to the control unit 20, and can previously store vehicle reference information for determining whether to promptly transfer, in the form of light, vehicle-running information for providing the state or convenience of a current vehicle to perform the safety or convenience operation of the current vehicle based on vehicle sensing information detected through the vehicle-sensing unit 100. The storage unit 30 can be disposed inside the above console type vehicular glance lighting apparatus or may be modified in various manners, such as having a construction in which the storage unit is disposed at other components of the vehicle in such a manner as to be spaced apart from the vehicular glance lighting apparatus.

The control unit 20 is electrically connected to the input unit 200, the vehicle-sensing unit 100, and the storage unit 30, and serves to determine whether to generate and generate vehicle-running information to be transferred in the form of light to the driver based on the vehicle sensing information of the vehicle-sensing unit 100 and the vehicle reference information of the storage unit 30.

The glance light unit 300 outputs predetermined light according to the vehicle-running information inputted thereto through the control unit 20 to provide the driver with vehicle-running information including information associated with safety needed for the driver's driving through a change of light as a background screen, thereby enabling a rapid response to an emergency situation without diverting the driver's driving attention to promote the driver's safe driving and enable prompt manipulation.

The glance light unit 300 of the present invention is aimed at allowing a driver to promptly and intuitively perceive vehicle-running information through the output of light. The glance light unit 300 is preferably disposed at a region shown in FIG. 3 in light of the output of light as a background screen that does not interfere with the driver's driving attention.

That is, the output of light through a conventional head-up display or a display device involves a problem in that since it requires a considerable attention in the course of the driver's information recognition in that character information or an icon for a specific situation is displayed, the loss time of the driver's driving attention is considerable, leading to a high possibility that a careless accident will happen. However, the vehicular glance lighting apparatus including the glance light unit 300 according to the present invention enables the output of light by a change in the output color of light or the output pattern of light (time or cycle) in a view range in which a driver gazes at to achieve delivery of light as a background screen to the driver, so that the driver does not need a separate concentration time, thereby preventing or minimizing a possibility of the driver's driving attention loss during the traveling of the vehicle.

Figure 3:
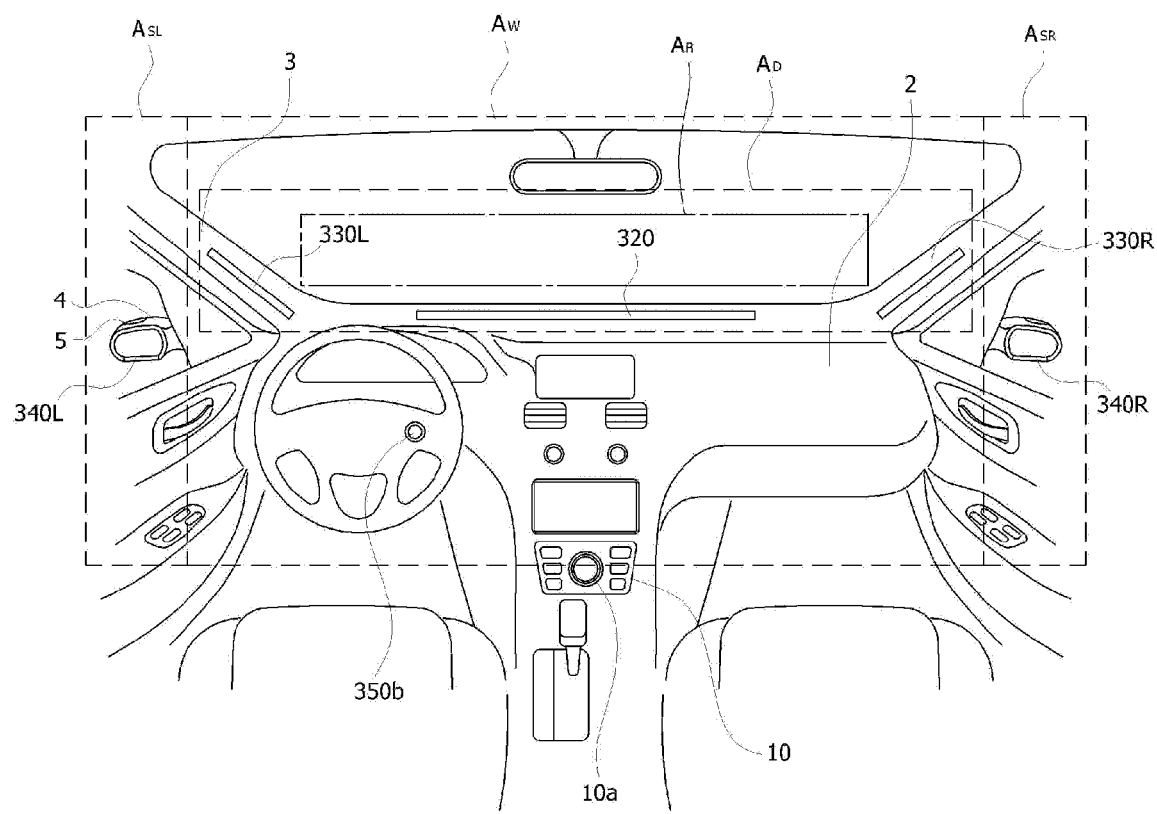
FIG. 3 is a schematic diagrammatic view illustrating the state of a vehicular glance lighting apparatus in accordance with an embodiment of the present invention.

That is, FIG. 3 shows a driver's view range in which the driver gazes at a road ahead of the driver's vehicle through a vehicle windshield for the running of a vehicle in the case where the driver sits on a driver's seat. The driver's view range The drive's view range includes a front view background range ($A_W$), a side view range ($A_{SL}$, $A_{SR}$), a front view background cross range ($A_D$), and a front concentration view range ($A_R$). The front view background range ($A_W$) is disposed at the outside of the front view background cross range ($A_D$), and the front view background cross range ($A_D$) is included in the front concentration view range ($A_R$). The front concentration view range ($A_R$) represents a region where the driver focuses this or her mind on the driving of the vehicle with a considerable attention to grasp a front-running vehicle or a front road surface state during the traveling of the vehicle. The front view background cross range ($A_D$) and the front view background range ($A_W$) are recognized as a dim image like a background screen by the driver's brain during the traveling of the vehicle, and the resolution of an image in the front view background cross range ($A_D$) is higher than that of an image in the front view background range ($A_W$). In addition, a left side view range ($A_{SL}$) and a right side view range ($A_{SR}$) positioned at the left and right of the front view background range ($A_W$) are view ranges for respective regions of the left and right of the driver, which represents a region which the driver perceives when he or she changes a lane or shifts his or her view to a side to perceive a relevant image of a side of the vehicle through a sideview mirror 4.

The glance light unit 300 according to the present invention can include a console glance light 310, a front inner glance light 320, a side inner glance light 330, and a side view glance light 340. The glance light unit 300 has a construction in which the console glance light 310 is disposed at the front view background range ($A_W$), the front inner glance light 320 and the side inner glance light 330 (330L, 330R) are disposed at the front view background cross range ($A_D$), and the side view glance light 340 is disposed at the side view range ($A_{SL}$, $A_{SR}$), respectively. Thus, although the driver does not focuses his or her attention on the respective lights of the glance light unit 300, he or she can acquire vehicle-running information necessary for the running of the vehicle without diverting the driving attention through the pattern or color of light outputted from the glance light unit 300.

As shown in FIGS. 1 to 3, the console glance light 310 according to the present invention is disposed at the outer periphery of a rotary switch 210 mounted in a console housing 201, but may be disposed at the front view background range ($A_W$). The console glance light 310 includes a console glance light source (not shown) and a console glance light guide (not shown). The console glance light source is implemented as a light source such as an LED, and the console glance light guide may be formed as a light guide member of a ring type. The console glance light source is disposed on a printed circuit board (not shown) positioned inside the console housing 201 and can output predetermined light in response to an electrical signal from the control unit. In this case, the light outputted from the console glance light source is outputted to the outside through the console glance light guide such that the driver can visually perceive vehicle-running information in the form of light. Although there is shown a construction in which such a console glance light source is disposed in the console housing 201 positioned at a center pascia or the like, the console glance light source may be modified in various manners, such as having a construction in which a steering wheel console glance light 310a is disposed at a steering wheel as shown in FIG. 3.

Figure 4:
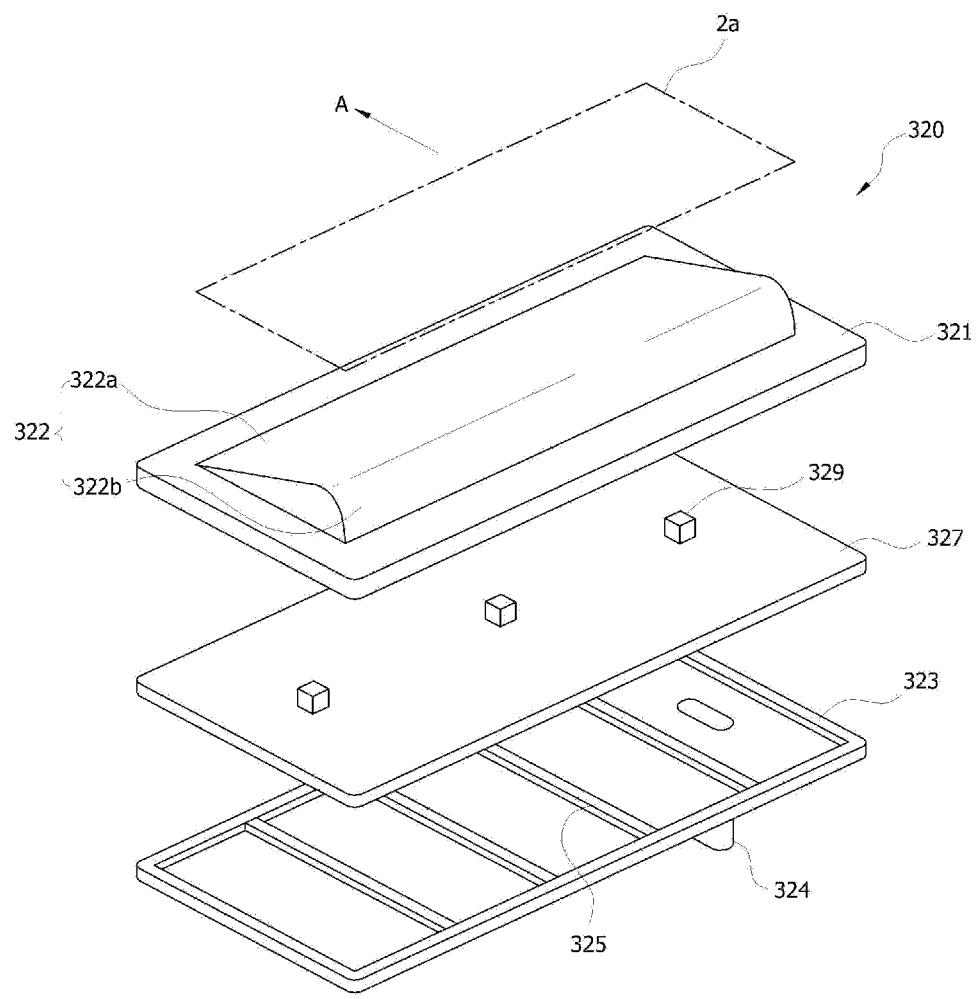
FIG. 4 is a schematic exploded view illustrating a front inner glance light of a vehicular glance lighting apparatus in accordance with an embodiment of the present invention.

The front inner glance light 320 and the side inner glance light 330 are positioned at the front view background cross range ($A_D$) when the driver views the front of the vehicle, so that light outputted from the front inner glance light 320 and the side inner glance light 330 can be recognized as being clearer than light outputted from the console glance light 310 disposed at the front view background range ($A_W$). The front inner glance light 320 and the side inner glance light 330 are disposed a dashboard and a front pillar of the vehicle. The front inner glance light 320 is disposed at the vehicle dashboard as show in FIG. 3, and is positioned at the front view background cross range ($A_D$). The front inner glance light 320 includes a light source such as an LED or the like, and an example of the front inner glance light 320 according to an embodiment of the present invention is shown in FIG. 4.

The front inner glance light 320 includes a front inner glance light cover 321, a front inner glance light base 323, a front inner glance light substrate 327, and a front inner glance light source 329. The front inner glance light cover 321 is disposed so as to be at least partly exposed to the outside through a dashboard mounting part 2a formed in the dashboard 2 as shown in FIG. 4. The front inner glance light cover 321 and the front inner glance light base 323 are engaged with each other to define an internal space therebetween so that the front inner glance light substrate 327 is disposed in the inner space. The front inner glance light source 329 implemented as an LED is disposed on one surface of the front inner glance light substrate 327 so as to be oriented toward the front inner glance light cover 321. A plurality of ribs 325 is disposed in the front inner glance light base 323 to stably support the front inner glance light substrate 327 and reinforce rigidity of the front inner glance light substrate 327 as well as to achieve the electrical communication with an external electrical device through a connector 324. In this embodiment, the front inner glance light source 329 is implemented as an LED, but another light source may be disposed depending to a design specification. The front inner glance light source 329 is preferably implemented as an LED in view of the characteristics of the vehicle in which durability or a stable driving is necessarily required in an extreme environment.

Meanwhile, the front inner glance light cover 321 of the present invention further include a structure for adjusting an irradiation direction of light outputted from the front inner glance light source 329. That is, the front inner glance light cover 321 includes a light transmission part 322. The light transmission part 322 includes a front inclined portion 322a and a rear portion 322b. The front inclined portion 322a is disposed such that an inclined surface thereof is oriented toward the front of the vehicle, indicated by a reference numeral A, i.e., a windshield of the vehicle. In addition, the surface of the rear portion 322b may be configured to form an angle of 45 degrees or more with respect to a plane of the dashboard of the vehicle.

By virtue of this construction, light that exits the front inner glance light source 329 is transmitted through the front inclined portion 322a and is irradiated to the outside, so that the driver can recognize vehicle-running information through the output of light at a background screen position within the driver's field of vision without interfering with the driver's view. In addition, the rear portion 322b is configured such that a light incident surface thereof forms a predetermined obtuse angle with respect to light outputted from the front inner glance light source 329 disposed on the front inner glance light substrate 327, and thus a large amount of light incident to the rear portion from the front inner glance light source is totally reflected or blocked, resulting in a considerably low transmittance of light outputted to the outside. Thus, light directly outputted to the driver's field of vision can be reduced or blocked to prevent the driver's view from being hindered. Although not specified in the drawings of this embodiment, micropatterns may be formed on the surface of the front inclined portion 322a, so that the light exiting the front inner glance light source 329 can be smoothly outputted to the outside.

The light exiting the front inner glance light source 329 is mostly outputted to the outside through the front inclined portion 322a, and light exiting the rear portion 322b is mostly hindered or blocked to prevent direct delivery of light to the driver's view, thereby preventing the driver's driving attention from being deteriorated. That is, directionality of light exiting the front inner glance light source 329 is strong in view of the characteristics of an emissive device such as an LED. Thus, in the case where light is directly irradiated to the driver's eyes from the front inner glance light source 329, the driver's view is caused to be obstructed, thereby leading to a high possibility of occurrence of a careless accident. For this reason, even though the light exiting the front inner glance light source 329 is oriented toward the front windshield of the vehicle through the front inclined portion 322a, the driver can perceive the overall output state of the light as a background screen within a driver's view range.

Figure 5:
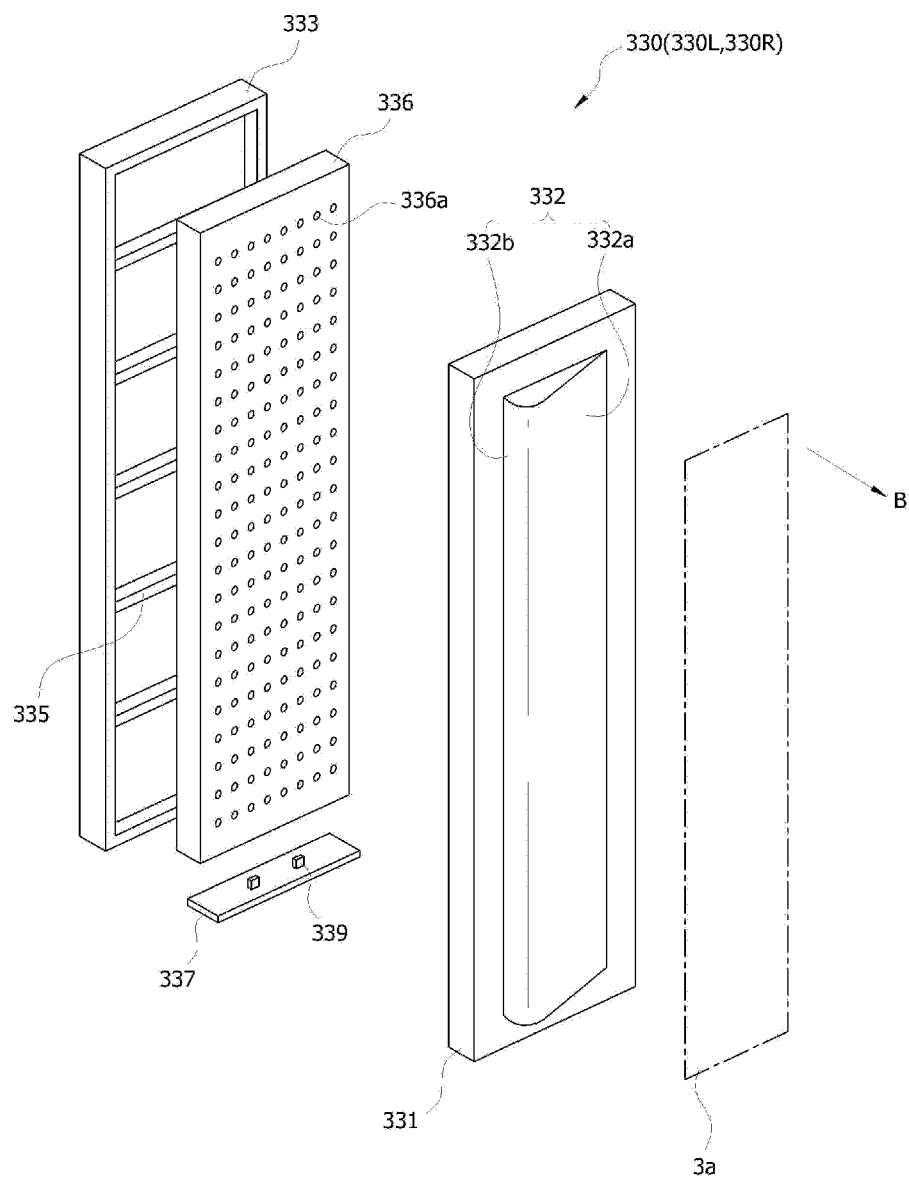
FIG. 5 is a schematic exploded view illustrating a side inner glance light of a vehicular glance lighting apparatus in accordance with an embodiment of the present invention.

In the meantime, the side inner glance light 330 is disposed at a front pillar 3 of the vehicle. The side inner glance light 330 may have a structure similar to that of the front inner glance light 320. The side inner glance light 330 includes a side inner glance light cover 331, a side inner glance light base 333, a side inner glance light substrate 337, a side inner glance light guide 336, and a side inner glance light source 339. The side inner glance light cover 331 is disposed so as to be at least partly exposed to the interior of the vehicle through a pillar mounting part 3a formed in a front pillar 3 as shown in FIG. 5. The side inner glance light cover 331 and the side inner glance light base 333 are engaged with each other to define an internal space therebetween. The side inner glance light 330 may have a structure in which a plurality of ribs 335 is disposed in the side inner glance light base 333 to stably support the side inner glance light guide 336.

The side inner glance light substrate 337 is disposed in the inner space defined between the cover and the base. The side inner glance light source 339 implemented as an LED is disposed on one surface of the side inner glance light substrate 337 so as to be oriented toward the side inner glance light guide 336. In this embodiment, the side inner glance light source 339 is implemented as an LED, but another light source may be disposed depending to a design specification. The side inner glance light source 339 is preferably implemented as an LED in view of the characteristics of the vehicle in which durability or a stable driving is necessarily required in an extreme environment. Light that exits the side inner glance light source 339 is transferred to the driver through the side inner glance light guide 336, and then the side inner glance light cover 331. The side inner glance light guide 336 may include light guide patterns 336a such as projections or recesses, which are formed on one surface thereof so as to smoothly output light therethrough.

Further, similarly to the front inner glance light cover, the side inner glance light cover 331 may have a construction for preventing obstruction of the driver's view due to a direct irradiation of light toward the driver. In other words, the side inner glance light cover 331 of the present invention may have a structure for adjusting an irradiation direction of light outputted from the side inner glance light source 339. As in the above-mentioned embodiment, the side inner glance light cover 331 includes a light transmission part 332. The light transmission part 332 includes a front inclined portion 332a and a rear portion 332b. The front inclined portion 332a is disposed such that an inclined surface thereof is oriented toward the front of the vehicle, indicated by a reference numeral B, i.e., a windshield of the vehicle. In addition, the surface of the rear portion 332b may be configured to form an angle of 45 degrees or more with respect to a plane of the front pillar of the vehicle.

By virtue of this construction, light that exits the side inner glance light source 339 is transmitted through the side inclined portion 332a and is irradiated to the outside, so that the driver can recognize vehicle-running information through the output of light at a background screen position within the driver's field of vision without interfering with the driver's view. In addition, the rear portion 332b is configured such that a light incident surface thereof forms a predetermined obtuse angle with respect to light outputted from the side inner glance light source 339 disposed on the side inner glance light substrate 337, and thus a large amount of light incident to the rear portion from the side inner glance light source is totally reflected or blocked, resulting in a considerably low transmittance of light outputted to the outside. Thus, light directly outputted to the driver's field of vision can be reduced or blocked to prevent the driver's view from being hindered. Although not specified in the drawings of this embodiment, micropatterns may be formed on the surface of the front inclined portion 332a, so that the light exiting the side inner glance light source 339 can be smoothly outputted to the outside.

The light exiting the side inner glance light source 339 is mostly outputted to the outside through the front inclined portion 332a, and light exiting the rear portion 332b is mostly hindered or blocked to prevent direct delivery of light to the driver's view, thereby preventing the driver's driving attention from being deteriorated. That is, directionality of light exiting the side inner glance light source 339 is strong in view of the characteristics of an emissive device such as an LED. Thus, in the case where light is directly irradiated to the driver's eyes from the side inner glance light source 339, the driver's view is caused to be obstructed, thereby leading to a high possibility of occurrence of a careless accident. For this reason, even though the light exiting the side inner glance light source 339 is oriented toward the front windshield of the vehicle through the side inclined portion 332a, the driver can perceive the overall output state of the light as a background screen within a driver's view range.

Figure 6:
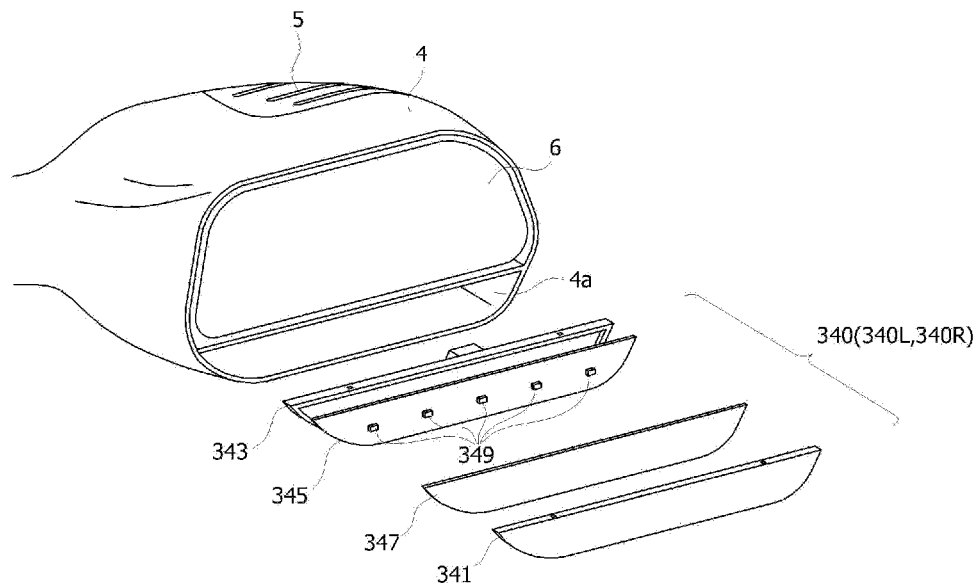
FIG. 6 is a schematic exploded view illustrating a side view glance light of a vehicular glance lighting apparatus in accordance with an embodiment of the present invention.

Also, meanwhile, the glance light unit 300 may further include a side view glance light 340. That is, the side view glance light 340 is disposed at a sideview mirror 4 of the vehicle. The side view glance light 340 is mounted at an end of the sideview mirror 4 of the vehicle, which is oriented toward the driver. Thus, the side view glance light 340 is positioned at the side view range ($A_{SL}, A_{SR}$) in the case where the driver shifts his or her sight to the sideview mirror 4 to grasp the side travel conditions of the vehicle. The sideview mirror 4 is shown in FIG. 6. A turn indicator 5 can be disposed at a front portion of the sideview mirror 4, the turn indicator outputs a turn signal for informing the driver of the traveling direction of the vehicle. The sideview mirror 4 includes a view mirror 6, and the side view glance light 340 of the present invention is disposed at a lower end of the sideview mirror 4.

The side view glance light 340 is mounted at an accommodating portion 4a formed at a lower end of the sideview mirror 4. The side view glance light 340 includes a side view glance light cover 341, a side view glance light base 343, a side view glance light substrate 345, a side view glance light guide 347, and a side view glance light source 349. The side view glance light substrate 345 is disposed in a space defined between the side view glance light cover 341 and the side view glance light base 343, and can be connected with an external electrical device through a connector formed on the side view glance light base 343.

A plurality of side view glance light sources 349 is disposed on one surface of the side view glance light substrate 345. The side view glance light guide 347 is disposed between the side view glance light source 349 and the side view glance light cover 341. The side view glance light guide 347 is formed of a light guide material of stably outputting light that exits the side view glance light source 349. The side view glance light guide 347 may have a structure in which patterns such as microprojections are formed on the surface of the side view glance light guide as described above in connection with the side inner glance light guide.

Figure 7:
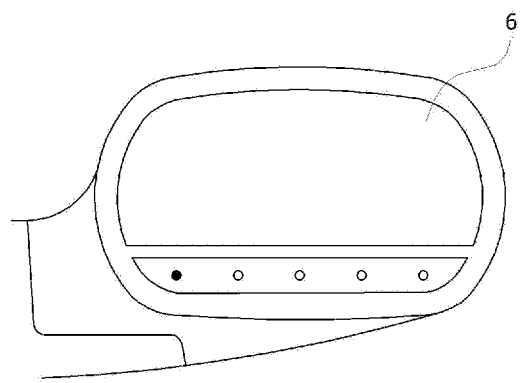
FIGS. 7 and 8 are schematic views illustrating the operational state of a side view glance light of a vehicular glance lighting apparatus in accordance with an embodiment of the present invention.
Figure 8:
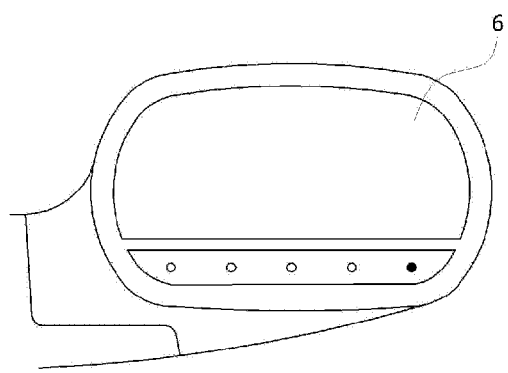
Figure 9:
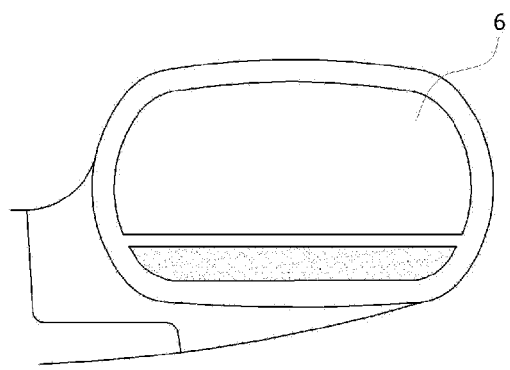
FIGS. 9 to 10 are schematic state views illustrating modifications of a side view glance light of a vehicular glance lighting apparatus in accordance with an embodiment of the present invention.
Figure 10:
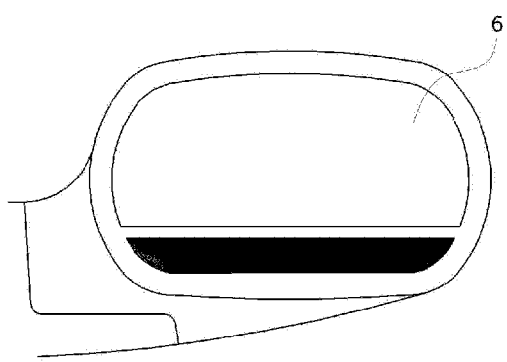

After being assembled, the side view glance light 340 is mounted at the accommodating portion 4a formed at the lower end of the sideview mirror 4, and can be operated as shown in FIGS. 7 and 8. That is, when a driver uses a signal generated upon the steering or turning of the steering wheel and detected from a steering angle sensor or operates a turn signal lamp mounted on the vehicle, a dead zone obstacle sensor disposed at a corresponding side of the vehicle detects whether or not a counterpart vehicle as an obstacle exists in a dead zone region in the steering direction of the vehicle or the traveling speed of the counterpart vehicle. In this case, vehicle sensing information as vehicle safety information including the obstacle information in the detected dead zone region and the relative speed between the driver's vehicle and the counterpart vehicle is transferred to the control unit 20, which in turn transfers predetermined vehicle-running information to the side view glance light based on the vehicle reference information stored in the storage unit 30 to allow the side view glance light to output the vehicle-running information in the form of light. In embodiments of FIGS. 7 and 8, the number of the side view glance light sources disposed at the side view glance light substrate 345 is 5. The blinking of the side view glance light source means that a counter part vehicle as an obstacle exists in the dead zone region in the corresponding steering direction of the vehicle. The side view glance light 340 has a construction in which among the side view glance light source, a side view glance light source located closer to the driver's vehicle means that the relative speed between the driver's vehicle and the counterpart vehicle is large and a side view glance light source located farther away from the driver's vehicle means that the relative speed between the driver's vehicle and the counterpart vehicle is small. In this case, the side view glance light 340 may have a construction in which the colors of the respective side view glance light sources are made different from each other such that if the relative speed is large, the side view glance light source outputs light with a red-based color, and if the relative speed is small, the side view glance light source outputs light with a blue-based color, thereby providing a degree of emergency on a visual basis. The level of the relative speed as described above is represented through the side view glance light source based on the location of the side view glance light source with respect to the driver's vehicle, but the representation of the level of the relative speed may be modified in various manners, such as being represented based on the number of side view glance light sources being blinked Moreover, although the side view glance light source is implemented as an LED, it may be implemented as another light source according to the circumstances. That is, as shown in FIGS. 9 and 10, the side view glance light source may be implemented as a plane emission type organic light emitting didode (OLED) display. The prompt and intuitive output of light as a background screen to the driver is permitted through such a plane emission type side view glance light source to prevent a possibility of occurrence of a careless accident at a side area of the vehicle.

Figure 11:
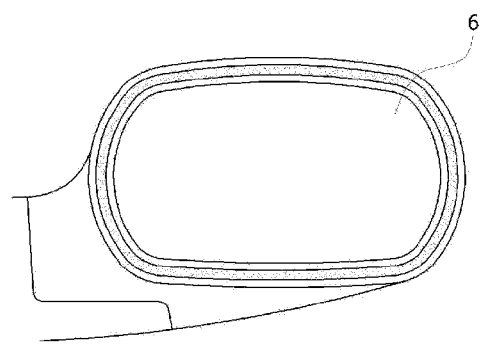
Figure 12:
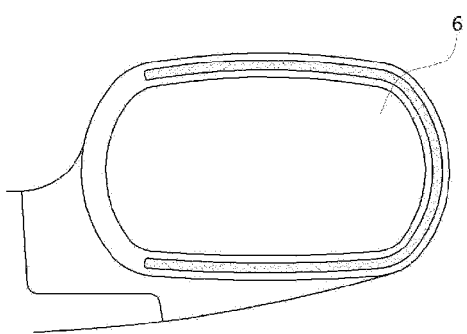
Figure 13:
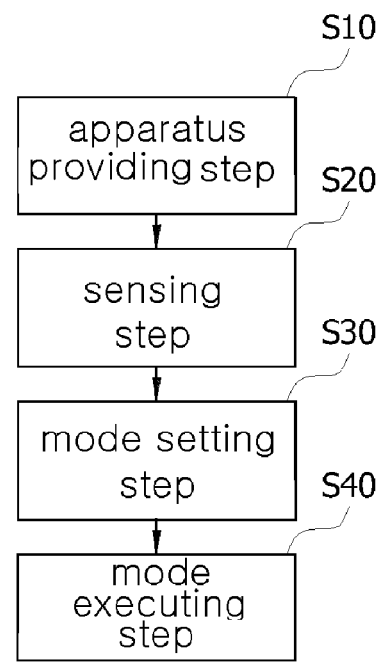
FIGS. 13 to 16 are flowcharts illustrating a method for controlling a vehicular glance lighting apparatus in accordance with an embodiment of the present invention.
Figure 14:
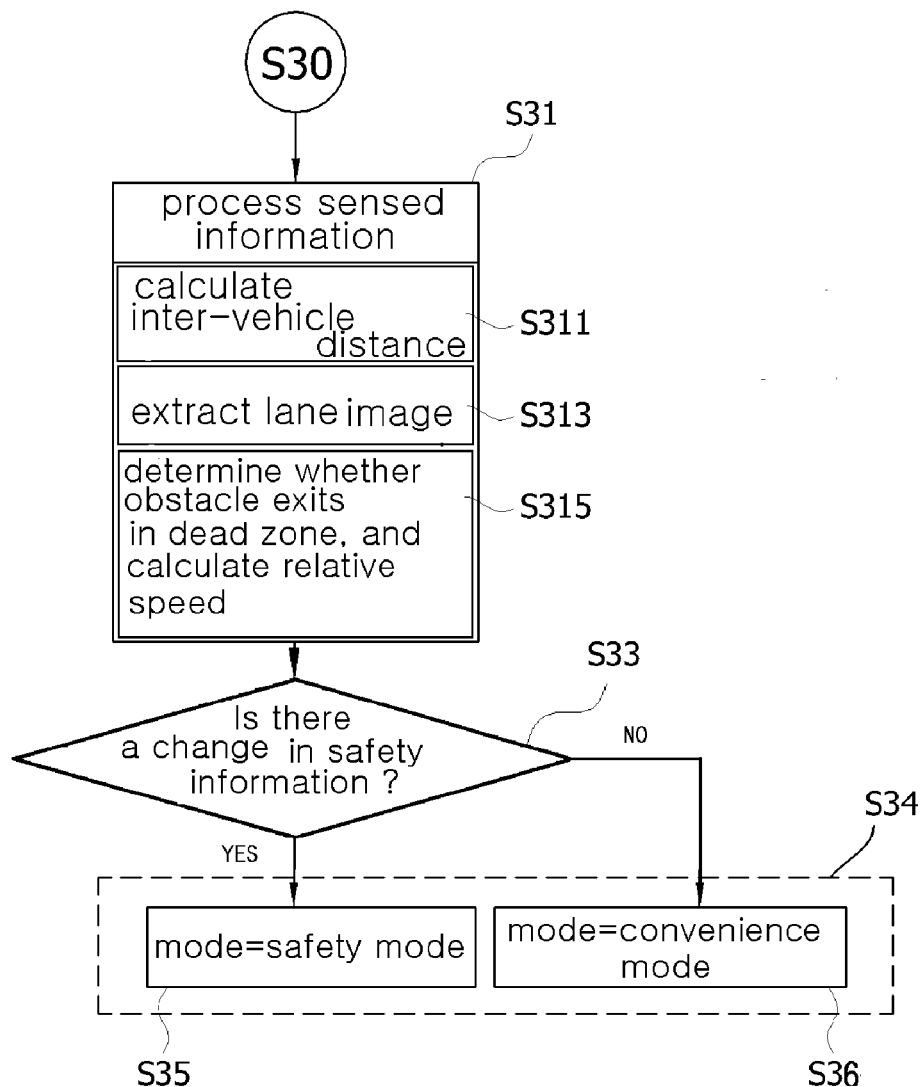
Figure 15:
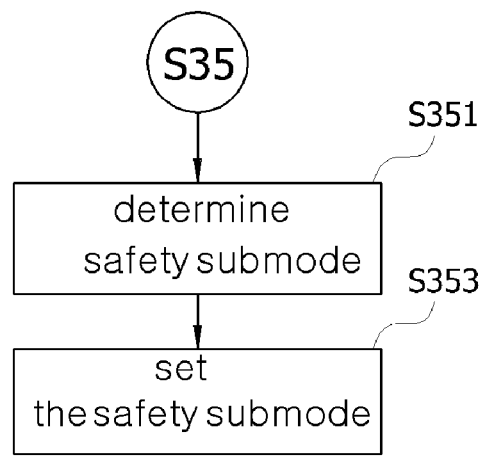
Figure 16:
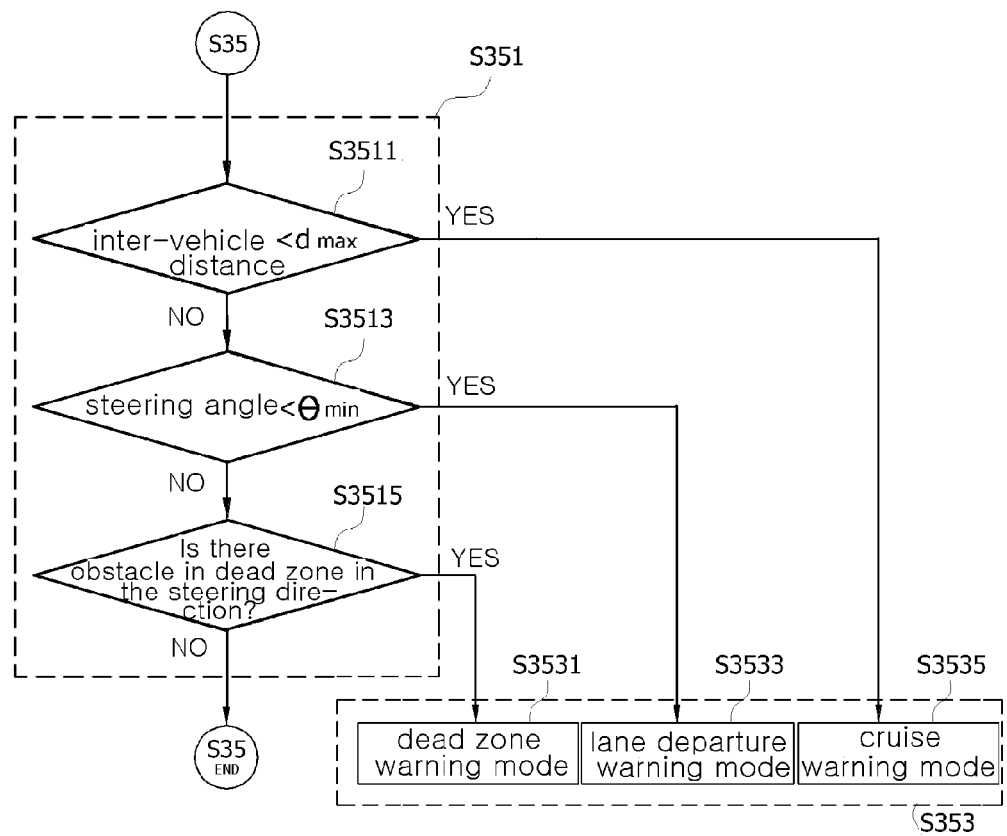

In addition, although it has been described in the above embodiment that the side view glance light is disposed at the lower end of the sideview mirror, it may be modified in various manners, such as having a construction in which the side view glance light is disposed along an entire or partial circumferential edge of the sideview mirror 6 as shown in FIGS. 11 and 12. In this case, the side view glance light guide included in the side view glance light may have a construction in which it is implemented in the form of an optical fiber such that light exiting the side view glance light source is transferred to the optical fiber type side view glance light guide and is outputted to the outside. In this case, the side view glance light guide has a structure in which it has patterns such as a plurality of microprojections formed on the surface thereof to allow light to smoothly exit the side view glance light source therethrough.

In the meantime, in the above embodiment, although it has been described and shown that the vehicle-sensing unit transfers a vehicle sensing signal to the control unit and the control unit is formed in a single structure, the control unit may has a module type structure in which it is provided in plural numbers, and each control unit is separately mounted in each module. That is, the control unit may have a construction in which an integrated type control unit separately includes: a cruise module (not shown) including a cruise control unit (not shown) of receiving front-running vehicle distance information as a vehicle sensing signal from the inter-vehicle distance sensor performing a cruise function of detecting the safety distance between a driver's vehicle and a front-running vehicle during the traveling of the driver's vehicle, and applying a cruise control signal to issue a safety warning through determination of the distance between the driver's vehicle and the front-running vehicle; a lane departure control module (not shown) including a lane departure control unit (not shown) of receiving lane sensing information from the lane image sensor detecting the lane state, and applying a lane departure control signal to issue a safety warning through determination of whether or not there is a lane departure; and a dead zone control module (not shown) of receiving dead zone obstacle information from the dead zone obstacle sensor detecting whether or not an obstacle exists in a dead zone region and the relative speed between the driver's vehicle and the front-running vehicle, and applying a dead zone control signal to issue a safety warning that warns about hazards that could cause a rear-ending in the dead zone region, so that each of the cruise module, the lane departure control module, and the dead zone control module transfers a predetermined signal determined based on a vehicle sensing signal or a vehicle sensing signal to the integrated type control unit, which in turn applies a control signal to the glance light unit to output vehicle-running information in the form of light to the driver.

The present invention provides a method for controlling the vehicular glance lighting apparatus 10 according to the above embodiments. The control method of the vehicular glance lighting apparatus 10 includes an apparatus providing step S10, a sensing step S20, a mode-setting step S30, and a mode executing step S40. In the apparatus providing step S10, the vehicular glance lighting apparatus 10 is provided. In order to avoid redundancy of description, the description of the provision of the apparatus is replaced with the description of the vehicular glance lighting apparatus 10 as mentioned above. After the vehicular glance lighting apparatus 10 is provided, the program proceeds to the sensing step S20 where the control unit 20 applies a control signal to the vehicle-sensing unit 100 and receives vehicle sensing information detected by the vehicle-sensing unit 100 from the vehicle-sensing unit 100. The vehicle sensing information includes vehicle safety information on safety of vehicles. The vehicle safety information includes the distance between a driver's vehicle and a front vehicle running ahead of the driver's vehicle, whether or not an obstacle exists in a dead zone region, the relative speed between the driver's vehicle and the obstacle, and information on lane departure during the traveling of the driver's vehicle. The vehicle sensing information includes vehicle indoor temperature information, GPS information used in a navigation unit for displaying a route to a destination of the vehicle, and the like, besides the vehicle safety information.

After the sensing step S20 is performed, the control unit 20 executes the mode-setting step S30. In the mode-setting step S30, the control unit 20 determines and sets a mode of outputting vehicle-running information to be outputted in the form of light through the present vehicular glance lighting apparatus based on the vehicle sensing information detected in the sensing step S20 and the vehicle reference information stored in the storage unit 30. The mode-setting step S30 includes a sensed information processing step S31, a safety information change determining step S33, and a mode selecting step S34. In the sensed information processing step S31, the control unit 20 extracts a change in the vehicle sensing information detected in the sensing step S20. The control unit 20 receives the vehicle sensing signal from the vehicle-sensing unit including the inter-vehicle distance sensor, the lane image sensor, and the dead zone obstacle sensor, processes the received vehicle sensing signal. Then, the control unit 20 calculates the distance between the driver's vehicle and a counterpart vehicle running ahead of the driver's vehicle, identifies a lane on a road surface during the traveling of the vehicle, determines whether or not an obstacle exists in the dead zone region, and calculates the relative speed between the vehicles. That is, the sensed information processing step S31 according to this embodiment includes an inter-vehicle distance calculating step S311, a lane image extracting step S313, a step S15 of determining whether or not an obstacle exists in the dead zone region and calculating the relative speed between the driver's vehicle and a counterpart vehicle as the obstacle. In the inter-vehicle distance calculating step S311, the control unit 20 processes the sensing signal inputted thereto from the inter-vehicle distance sensor, applies a calculation control signal to the arithmetic logic unit 40 to allow the arithmetic logic unit 40 to perform calculation, and extracts the relative distance between the driver's vehicle and a front-running vehicle. Thereafter, the program proceeds to the lane image extracting step S313 where the control unit processes an lane image information signal inputted thereto the lane image sensor and extracts lane information from the processed signal. Next, in the determining and calculating step S315, the control unit processes a sensing signal inputted thereto from the dead zone obstacle sensor, and determines whether or not an obstacle exists in the dead zone region and calculates the relative speed between the driver's vehicle and a counterpart vehicle as the obstacle. The description of the calculation of the distance or relative speed from the inter-vehicle distance sensor and the processing of the image from the lane image sensor will be omitted in this embodiment as being known in the art.

After the sensed information processing step S31 is performed, the control unit performs the safety warning determining step S33. That is, the control unit 20 determines whether a safety warning as vehicle-running information is needed to be issued to the driver based on a result of comparison between vehicle reference information and safety-related vehicle safety information of the respective items of vehicle sensing information whose signal is sensed and processed. The control unit 20 compares the vehicle safety information whose signal is processed in the step S31 with the vehicle reference information stored in the storage unit 30. Then if it is determined that a safety warning is needed in any one of the items related with the safety information, the control unit 2 determines a current operating mode to be executed and selects a safety mode. On the contrary, if it is determined that a safety warning is not needed in any one of the items related with the safety information through comparison with the vehicle reference information, the control unit 2 executes a mode selecting step S34 of determining the operating mode to be executed as a convenience mode and setting a predetermined operating mode (S36).

In the step S34, it is determined by the control unit that the currently selected operating mode is the convenience mode (S36), the control unit 20 executes the convenience mode according to the manipulation state of the driver, inputted through the input unit 200. In this case, information on light outputted from the glance light unit for execution of the convenience mode is previously stored in the storage unit 30. Such light-related information is stored as preset glance light information in the storage unit 30. That is, the preset glance light information may include color information set to form a contrast to a vehicle indoor temperature to achieve visual perception the driver in response to the vehicle indoor temperature, or data for outputting, in the form of light, vehicle-running information for a convenience function such as the output of light in the advance direction of the vehicle at an intersection located ahead of the driver's vehicle or the output of light for vehicle speed information during the operation of the navigation unit. For example, in association with a vehicle air conditioning unit, the preset glance light information may include color information set to form a contrast to a current vehicle indoor temperature to allow a visual feeling to be bestowed to the driver to output light with a blue-based color to provide a cool feeling to the driver when the current vehicle indoor temperature is high. In addition, in association with a navigation unit, the preset glance light information may include a color for representing the traveling direction of the driver's vehicle at an intersection located ahead of the driver's vehicle on a road travel route or a color including an light output period and period information. The preset glance light information may include color or light output period information for issuing a visual warning to the driver in the case where a vehicle traveling speed at a current driver's vehicle position exceeds reference road speed limit information using vehicle traveling speed information, GPS information and road speed limit information on a navigation map stored in the storage unit, in the case where the vehicle traveling speed at a current driver's vehicle position is less than the road speed limit information and the driver's vehicle is positioned at a speed area close to the road speed limit information, and in the case where the driver's vehicle is positioned at a speed area far smaller than the road speed limit information.

Meanwhile, in the step S34, if the control unit 20 sets the current operating mode as the safety mode (S35), it may further perform a process of setting a safety submode. That is, the safety submode includes a cruise warning mode of warning a driver of the safety distance between the driver's vehicle and a front-running vehicle, a lane departure warning mode of warning the driver of whether or not the driver's vehicle departs a lane, and a dead zone warning mode of warning the driver of not only whether or not an obstacle exists at a side of the vehicle but also the relative speed between the driver's vehicle and another vehicle as the obstacle.

The safety mode-setting step S35 includes a safety submode-determining step S351 and a safety submode-setting step S353. The safety submode-determining step S351 includes an inter-vehicle distance-comparing step S3511, a steering angle comparing step S3513, and a dead zone obstacle-determining step S3515. The vehicle reference information stored in the storage unit 30 includes a minimum safety distance (dmax) indicating a minimum safety distance between the driver's vehicle and a front-running vehicle, a minimum steering angle (θ) for determining whether or not the driver steers the steering wheel, color information preset in response to the vehicle sensing information or light outputting period information, and preset glance light information that allows the driver to easily perceive an operating mode outputted in connection with current vehicle-running information through a color of light perceived from a background screen or a light outputting period as well as to promptly cope with a vehicle travel risk through the current vehicle-running information.

The safety submode-determining step S351 will be described in detail hereinafter with reference to FIG. 17.

Figure 17:
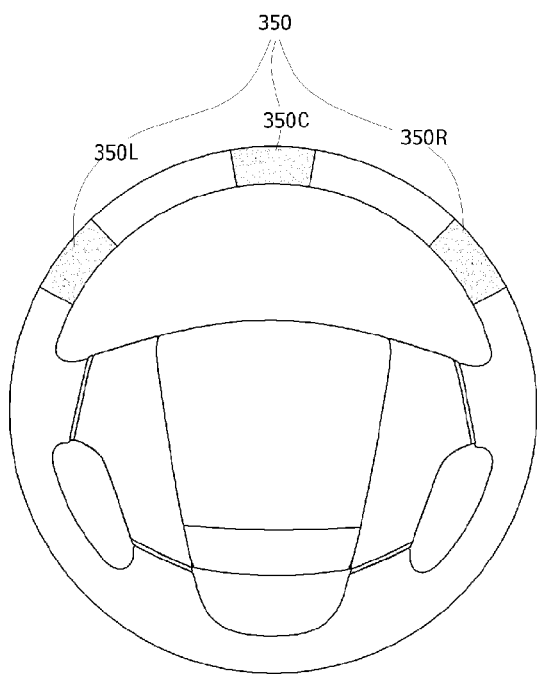
FIG. 17 is a schematic state view illustrating a steering wheel rim glance light of a vehicular glance lighting apparatus in accordance with an embodiment of the present invention.

Referring to FIG. 17, in the inter-vehicle distance-comparing step S3511, the control unit 20 compares the front-running vehicle distance information (d) detected by the inter-vehicle distance sensor 111 with the minimum safety distance (dmax) stored in the storage unit 30. If it is determined by the control unit 20 that the front-running vehicle distance information (d) exceeds the minimum safety distance (dmax), the program proceeds to a step S3513 where the control unit 20 performs the steering angle comparing or steering intention determining step S3513. On the contrary, if If it is determined by the control unit 20 that the front-running vehicle distance information (d) is less than the minimum safety distance (dmax), the program proceeds to a step S3535 where the control unit 20 performs a cruise warning mode-setting step S3535 of setting the safety submode as a cruise warning mode.

On the other hand, if it is determined by the control unit 20 that the front-running vehicle distance information (d) exceeds the minimum safety distance (dmax), the control unit 20 performs the steering intention determining step S3513. In the step S3513, the control unit 20 compares a steering angle (θ) of the driver's vehicle steering wheel with a minimum steering angle (θmin) and determines whether or not there is a driver's steering intention. The control unit 20 can determine whether or not the steering operation of the vehicle steering wheel involves the driver's steering intention through the step S3513. If it is determined in the step S3513 that the steering angle (θ) of the driver's vehicle steering wheel exceeds the minimum steering angle (θmin) and the operational state of the turn indicator 5 is in an ON state, the control unit 20 determines that the driver's steering intention is definitely involved in the steering operation of the steering wheel by the driver, and then the program proceeds to the step S3515. On the contrary, if it is determined in the step S3513 that the steering angle (θ) of the driver's vehicle steering wheel is less than the minimum steering angle (θmin) and the operational state of the turn indicator 5 is not in an ON state, the control unit determines that the driver's steering intention is not definitely involved in the steering operation of the steering wheel by the driver, and then the program proceeds to the step S3535 where the control unit 20 performs the lane departure warning mode-setting step S3533 of setting the safety submode in the safety submode-setting step S353 as a lane departure warning mode. Subsequently, if it is determined that a lane departure occurs based on the sensed information from the lane image sensor in the mode executing step S40, the control unit 20 can issue a safety warning to the driver using the preset glance light information.

On the other hand, if it is determined in the step S3513 that the steering angle (θ) of the driver's vehicle steering wheel exceeds the minimum steering angle (θmin) and the operational state of the turn indicator 5 is in an ON state, the control unit 20 executes the dead zone obstacle-determining step S3515. The control unit 20 determines whether or not an obstacle, i.e., a counterpart vehicle exists in a dead zone region in the steering direction of the driver's vehicle, calculated from the steering angle sensor. The term "the dead zone region" as used herein refers to a region where the driver's field of vision is obstructed, i.e., a region that is shielded from the driver's field of vision by a pillar of the vehicle or a region that is difficult for the driver to visually identify even through the sideview mirror. The dead zone region described in this embodiment includes a side region, a side-rear region, or a side-front region of the vehicle according to the circumstances, and may be defined in various manners, such as including a side region of the vehicle, which can be perceived through the sideview mirror 6. If it is determined in the step S3515 that a counterpart vehicle exists at a side region of the vehicle including the dead zone region, the program proceeds to the step S3531 where the control unit 20 executes the dead zone warning mode-setting step S3531 of setting the safety submode as the dead zone warning mode. On the contrary, if it is determined in the step S3515 that a counterpart vehicle does not exist at the side region of the vehicle including the dead zone region, the program returns to the step S20 where the control unit 20 repeatedly executes the sensing step.

Through such a control flowchart, after each safety submode is set in the safety submode-setting step S353, the control unit 20 performs a function of outputting light suitable for a predetermined safety submode using the preset glance light information stored in the storage unit 30 and provides vehicle-running information in the form of light to the driver.

Thereafter, the control unit 20 executes a predetermined operating mode selected among items of the safety submode or the convenience mode, and can selectively or wholly operates the console glance light, the front/side inner glance light, and the side view glance light, if necessary.

In the meantime, although it has been described in the above embodiments that the glance light unit is disposed at the console housing, the central portion of a steering wheel, the dashboard, the front pillar, or the sideview mirror, the glance light unit of the present invention may have a construction in which it is disposed at a rim 8 of the steering wheel. That is, in FIGS. 17 and 18, there is shown a steering wheel rim glance light 350 according to an embodiment of the present invention, where is disposed at a rim of the steering wheel. The steering wheel rim glance light 350 may be provided in single number, but in this embodiment, three steering wheel rim glance light 350 are disposed similarly to the construction of the front inner glance light and the side inner glance light, which are respectively disposed at the dashboard and the front pillar, so that orientation of the safety warning can be represented when outputting the vehicle-running information in the form of light.

Figure 18:
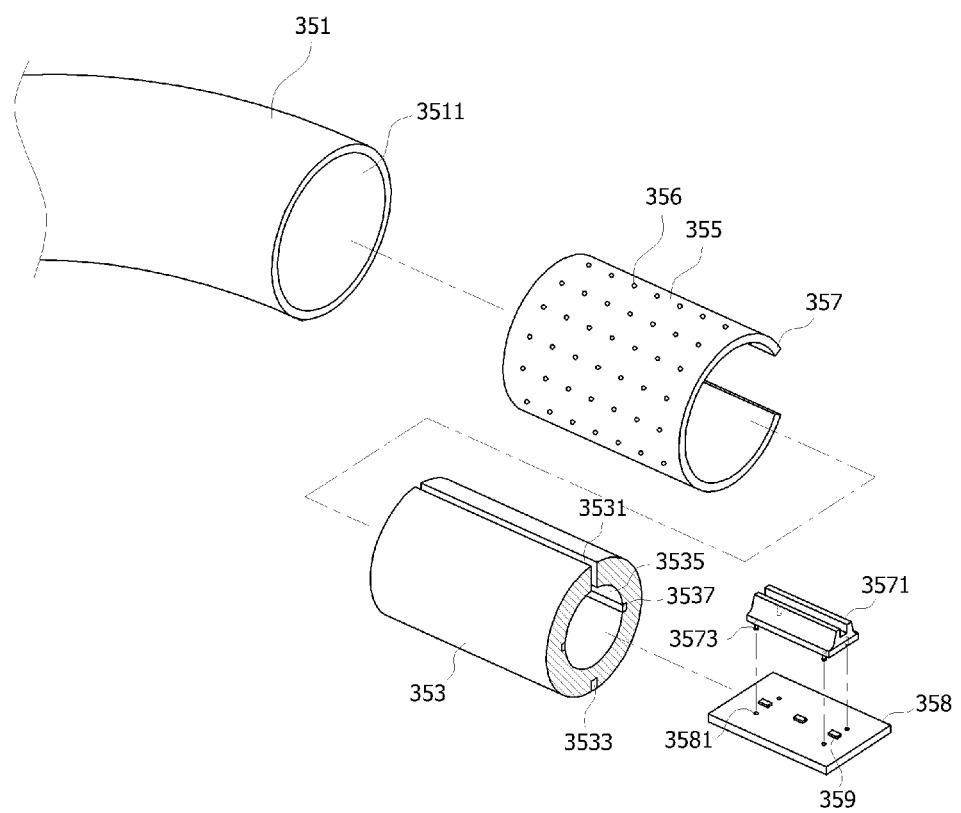
FIG. 18 is a schematic exploded view illustrating a steering wheel rim glance light of a vehicular glance lighting apparatus in accordance with an embodiment of the present invention

The steering wheel rim glance light 350 includes a rim cover 351 through which light can be transmitted and is coupled thereto or formed integrally therewith. The rim cover 351 has an internal spaced defined at the center thereof. Other elements are disposed in the internal space 3511 of the rim cover 351. The steering wheel rim glance light 350 includes a steering wheel rim glance light guide 355, a steering wheel rim glance light core 353, a steering wheel rim glance substrate 358, and a steering wheel rim glance light source 359. The rim cover 351 is preferably formed of a translucent or transparent material to allow light to exit one surface thereof so as to be oriented toward the driver. The steering wheel rim glance light core 353 is insertingly fixed to the internal space 3511. The steering wheel rim glance light core 353 serves to securely fix the position of the steering wheel rim glance light guide 355 and the steering wheel rim glance substrate 358. The steering wheel rim glance light core 353 has a core space 3535 defined therein and a substrate mounting portion 3537 formed on the inner peripheral surface thereof so that the steering wheel rim glance substrate 358 is mounted in the substrate mounting portion 3537. The steering wheel rim glance substrate 358 is connected to an external electrical device such as the control unit 20 through a wiring (not shown). The steering wheel rim glance light source 359 is disposed on one surface of the steering wheel rim glance substrate 358. Light exiting the steering wheel rim glance light source 359 is outputted to the outside through the steering wheel rim glance light guide 355. The steering wheel rim glance light guide 355 may be configured to have a curved structure as shown in FIG. 18, and may be configured to have a flexible flat structure in which is insertingly mounted in the steering wheel rim glance light core 353.

The steering wheel rim glance light guide 355 is insertingly mounted at one end thereof in a through-groove 3531 formed longitudinally on the circumference of the steering wheel rim glance light core 353 and is inserted into the core space 3535. The one end of the steering wheel rim glance light guide 355 inserted into the core space 3535 is mounted on a core light guide 3571. The core light guide 3571 includes a core light guide mounting part 3573. The core light guide mounting part 3573 is insertingly mounted in a rim glance substrate mounting part 3581 formed in the steering wheel rim glance substrate 358. The core light guide is formed of a light guide material, and is disposed on a top of the steering wheel rim glance light source 359. Thus, light exiting the steering wheel rim glance light source 359 is outputted to the outside through the core light guide 3571 and the steering wheel rim glance light guide 355. The steering wheel rim glance light guide 355 has micropatterns 356 such as microprojections formed on one surface thereof so that light exiting the steering wheel rim glance light source 359 and transferred through one end 357 can be smoothly outputted to the outside. Three steering wheel rim glance lights 350 are provided on the steering wheel such that the front, the left, and the right can be represented to based on a neutral state of the steering wheel to indicate orientation. Such orientation may be adjusted depending on the steering of the steering wheel according to the circumstances. For example, the rotational angle of a current vehicle steering wheel can be calculated by calculating the steering angle detected by the steering angle sensor of the vehicle, and the rotational state of the current steering wheel can be grasped based on the calculated rotational angle. Thus, when the vehicle steering wheel is rotated by 180 degrees, light outputted to indicate left and right orientation of the steering wheel rim glance light is reversed, and hence it may be selected so as to be outputted correspondingly to a 180 degree-reversed state. In other words, in the case where the front orientation is represented by a steering wheel rim glance light denoted by a reference numeral 350C, the right orientation is represented by a steering wheel rim glance light denoted by a reference numeral 350R, and the left orientation is represented by a steering wheel rim glance light denoted by a reference numeral 350L in the neutral state of the steering wheel, when the steering wheel is rotated by 180 degrees, the respective steering wheel rim glance lights representing the left and right orientation may be controlled to be replaced by the steering wheel rim glance lights denoted by the references numerals 350R and 350L. However, such a change in orientation falls within the case where the vehicle runs at low speed. In the case where the vehicle runs at high speed, the rotational angle range of the steering wheel is considerably small, and thus the change in orientation may not be applied. In addition, such a change in orientation of the steering wheel rim glance light may cause confusion to the driver according to the circumstances. For this reason, the steering wheel rim glance light may have a construction in which when the vehicle steering wheel is in a rotational state or is rotated beyond a preset minimum rotational angle range, such orientation representation is interrupted.

The above-mentioned embodiments are merely examples for explaining the present invention, and can be constructed in various manners without limiting the present invention. For example, although it has been described in the above embodiment that the method for controlling a vehicular glance lighting apparatus according to the present invention is associated with a lane departure warning function, a cruise warning function, or a dead zone obstacle warning function, the present invention may be constructed in various manners in a range of implementing vehicle-running information in the form of light as a background screen within a driver's field of vision, such as having a construction in which it is associated with a driver state monitoring function of monitoring a vehicle driver's state As described above, the vehicular glance lighting apparatus and method for controlling the same in accordance with the present invention as constructed above has the following advantageous effects.

First, the vehicular glance lighting apparatus and method for controlling the same in accordance with the present invention allows vehicle-running information related with the running of a vehicle to be outputted in the form of light as a background screen, so that a driver can perceive the vehicle-running information without diverting or obstructing the driver's driving attention, thereby enhancing the driver's ability to cope with a vehicle travel risk during the traveling of the vehicle.

Second, the vehicular glance lighting apparatus and method for controlling the same in accordance with the present invention allows a driver to visually perceive the vehicle-running information without interfering with the driver's driving attention using a color of light as a background screen or a light outputting period through the glance light unit disposed beyond a driver's concentrated view range, thereby promptly coping with a vehicle travel risk. In addition, the glance light unit allows a driver to promptly cope with a vehicle travel risk using orientation information along with information of light as a background screen through the console glance light or the front/side inner glance light.

Third, the vehicular glance lighting apparatus and method for controlling the same in accordance with the present invention allows a driver to visually perceive the vehicle-running information without interfering with the driver's driving attention using a color of light as a background screen or a light outputting period through the glance light unit disposed beyond a driver's concentrated view range, thereby promptly coping with a vehicle travel risk. In addition, the glance light unit allows a driver to promptly cope with a vehicle travel risk by acquiring information on whether or not a counterpart vehicle exists, the relative speed between vehicles or a degree of emergency in a vehicle side region including a dead zone region beyond a simple warning through the side view glance light.

Fourth, the vehicular glance lighting apparatus and method for controlling the same in accordance with the present invention allows a driver allows a driver to visually perceive the vehicle-running information without interfering with the driver's driving attention using a color of light as a background screen or a light outputting period through the glance light unit disposed beyond a driver's concentrated view range, thereby promptly coping with a vehicle travel risk. In addition, the present invention can provide vehicle safety information such as the cruise warning, the lane departure warning, and the dead zone obstacle warning through the control process of each operating mode of the glance light unit, as well as can enhance convenience of a driver through execution of the convenience mode in cooperation with an air conditioning device or a navigation device during the traveling of the vehicle.

While the present invention has been described in connection with the optimum exemplary embodiments illustrated in the drawings, the terminology used herein is for the purpose of describing particular embodiments only and is not intended to limit the meaning of the invention or limit the scope of the invention disclosed in the claims. Also, it is to be understood that various equivalent modifications and variations of the embodiments can be made by a person having an ordinary skill in the art without departing from the spirit and scope of the present invention. Therefore, various embodiments of the present invention are merely for reference in defining the scope of the invention, and the true technical scope of the present invention should be defined by the technical spirit of the appended claims.

What is claimed is:

1. A vehicular glance light apparatus comprising:
an input unit configured to generate an input signal that can be manipulated by a driver of a vehicle;
a vehicle-sensing unit configured to detect vehicle sensing information including vehicle safety information for the running of the vehicle;
a storage unit configured to store vehicle reference information including safety reference information for determining the vehicle running safety;
a control unit electrically connected to the input unit, the vehicle-sensing unit, and the storage unit, and configured to provide the driver with vehicle-running information based on the vehicle sensing information of the vehicle-sensing unit and the vehicle reference information of the storage unit; and
a glance light unit disposed at a position within the vehicle driver's view range, and configured to output light corresponding to the vehicle-running information in response to a glance light control signal from the control unit to allow the vehicle driver to intuitively perceive information of light while maintaining the driver's driving attention,
wherein the glance light unit comprises a front inner glance light unit disposed at a dashboard of the vehicle, the front inner glance light unit including a front light source and a front light cover which covers the front light source, the front light cover including a first portion facing a windshield of the vehicle and a second portion inclined to the first portion and facing a rear of the vehicle and the driver, wherein:
the first portion has a first side facing the windshield and an opposite second side facing the first light source, and the second portion has an upper surface facing the rear of the vehicle and an opposite light incident surface facing the first light source;
light from the front light source is transmitted toward a windshield of the vehicle through the first portion, generating the information of light within the driver's view range; and
the second portion has a low light transmittance such that the light from the front light source incident to the light incident surface facing the first light source is substantially blocked by the second portion from passing through the second portion in a direction to the rear of the vehicle and from directly being delivered to the driver's eyes,
wherein the glance light unit further comprises a side inner glance light unit disposed at a front pillar of the vehicle, wherein the side inner glance light unit includes a side inner glance light cover disposed to be at least partly exposed to the interior of the vehicle through a pillar mounting part formed in a front pillar, a side inner glance light base engaged with the side inner glance light cover, a side inner glance light substrate disposed in an inner space defined between the side inner glance light cover and the side inner glance light base, a side inner glance light guide stably supported by a plurality of ribs disposed in the side inner glance light base, and a side inner glance light source disposed on one surface of the side inner glance light substrate so as to be oriented toward the side inner glance light guide, wherein the side inner glance light guide includes light guide patterns formed on one surface thereof so as to smoothly output light therethrough, wherein the side inner glance light cover includes a light transmission part, wherein the light transmission part comprises:

a front inclined portion disposed such that an inclined surface thereof is oriented toward the front of the vehicle, and a rear portion configured to form an angle of 45 degrees or more with respect to a plane of the front pillar of the vehicle.

2. The vehicular glance light apparatus according to claim 1, wherein the vehicle-sensing unit comprises a vehicle indoor temperature sensor, and the vehicle sensing information further comprises vehicle air conditioning information including the indoor temperature of the vehicle.

3. The vehicular glance light apparatus according to claim 1, wherein the vehicle-sensing unit comprises an inter-vehicle distance sensor configured to detect the distance between the driver's vehicle and a front-running vehicle during the traveling of the driver's vehicle, and the vehicle safety information comprises front-running vehicle distance information outputted from the inter-vehicle distance sensor.

4. The vehicular glance light apparatus according to claim 1, wherein the vehicle-sensing unit comprises a lane image sensor configured to detect a lane status during the traveling of the driver's vehicle, and the vehicle safety information comprises lane sensing information outputted from the lane image sensor.

5. The vehicular glance light apparatus according to claim 1, wherein the vehicle-sensing unit comprises a dead zone obstacle sensor configured to detect whether or not an obstacle exists in a side dead zone of the driver's vehicle and the relative speed between the driver's vehicle and the obstacle, and the vehicle safety information comprises information on whether or not the obstacle exists in the side dead zone and information on the relative speed, which are outputted from the dead zone obstacle sensor.

6. The vehicular glance light apparatus according to claim 1, wherein the glance light unit further comprises a side view glance light disposed at an end of a sideview mirror of the driver's vehicle so as to oriented toward the driver.

7. The vehicular glance light apparatus according to claim 1, wherein the glance light unit further comprises a steering wheel rim glance light disposed at a rim of the steering wheel of the driver's vehicle.

8. The vehicular glance light apparatus according to claim 1, wherein:

light from the side inner glance light source is transmitted toward the windshield of the vehicle through the first inclined portion, generating the information of light within the driver's view range; and the rear portion has a low light transmittance such that the light incident to the rear portion from the side light source is substantially blocked by the rear portion.

9. A method for controlling a vehicular glance light apparatus, wherein the method comprises:

an apparatus providing step of providing a vehicular glance light apparatus comprising an input unit configured to generate an input signal that can be manipulated by a driver of a vehicle, a vehicle-sensing unit configured to detect vehicle sensing information including vehicle safety information for the running of the vehicle, a storage unit configured to store vehicle reference information including safety reference information for determining the vehicle running safety, a control unit electrically connected to the input unit, the vehicle-sensing unit, and the storage unit, and configured to provide the driver with vehicle-running information based on the vehicle sensing information of the vehicle-sensing unit and the vehicle reference information of the storage unit, and a glance light unit disposed at a position within the vehicle driver's view range, and configured to output light corresponding to the vehicle-running information in response to a glance light control signal from the control unit to allow the vehicle driver to intuitively perceive information of light while maintaining the driver's driving attention, wherein the glance light unit comprises a front inner glance light unit disposed at a dashboard of the vehicle, the front inner glance light unit including a front light source and a front light cover which covers the front light source, the front light cover including a first portion facing a windshield of the vehicle and a second portion inclined to the first portion and facing a rear of the vehicle and the driver, wherein:

the first portion has a first side facing the windshield and an opposite second side facing the first light source, and the second portion has an upper surface facing the rear of the vehicle and an opposite light incident surface facing the first light source;

light from the front light source is transmitted toward a windshield of the vehicle through the first portion, generating the information of light within the driver's view range; and the second portion has a low light transmittance such that the light from the front light source incident to the light incident surface facing the first light source is substantially blocked by the second portion from passing through the second portion in a direction to the rear of the vehicle and from directly being delivered to the driver's eyes, wherein the glance light unit further comprises a side inner glance light unit disposed at a front pillar of the vehicle, wherein the side inner glance light unit includes a side inner glance light cover disposed to be at least partly exposed to the interior of the vehicle through a pillar mounting part formed in a front pillar, a side inner glance light base engaged with the side inner glance light cover, a side inner glance light substrate disposed in an inner space defined between the side inner glance light cover and the side inner glance light base, a side inner glance light guide stably supported by a plurality of ribs disposed in the side inner glance light base, and a side inner glance light source disposed on one surface of the side inner glance light substrate so as to be oriented toward the side inner glance light guide, wherein the side inner glance light guide includes light guide patterns formed on one surface thereof so as to smoothly output light therethrough, wherein the side inner glance light cover includes a light transmission part, wherein the light transmission part comprises:
- a front inclined portion disposed such that an inclined surface thereof is oriented toward the front of the vehicle, and
- a rear portion configured to form an angle of 45 degrees or more with respect to a plane of the front pillar of the vehicle, a sensing step of allowing the vehicle-sensing unit to detect vehicle sensing information including vehicle safety information in response to a sensing control signal from the control unit;

a mode-setting step of allowing the glance light unit to set an operating mode according to the vehicle-running information to be provided to the driver based on the vehicle sensing information of the vehicle-sensing unit and the vehicle reference information of the storage unit; and a mode executing step of allowing the control unit to output the glance light control signal to the glance light unit according to the operating mode set in the mode-setting step.

10. The method according to claim 9, wherein the mode-setting step comprises:
- a sensed information processing step of processing the vehicle sensing information of the vehicle-sensing unit detected in the sensing step and extracting changes in the processed vehicle sensing information;
- a safety information change determination step of determining whether or not there is a change in the vehicle safety information among the changes in the vehicle sensing information extracted in the sensed information processing step;
- a mode selecting step of selecting any one of a safety mode and a convenience mode based on a determination result in the safety information change determination step.

11. The method according to claim 10, wherein the vehicle-sensing unit comprises an inter-vehicle distance sensor configured to detect the distance between the driver's vehicle and a front-running vehicle during the traveling of the driver's vehicle, a lane image sensor configured to detect a lane status during the traveling of the driver's vehicle, a dead zone obstacle sensor configured to detect whether or not an obstacle exists in a side dead zone of the driver's vehicle and the relative speed between the driver's vehicle and the obstacle, and a steering angle sensor configured to detect the rotational angle of the steering wheel of the driver's vehicle, wherein the vehicle safety information comprises front-running vehicle distance information outputted from the inter-vehicle distance sensor, lane sensing information outputted from the lane image sensor, and information on whether or not the obstacle exists in the side dead zone and information on the relative speed, which are outputted from the dead zone obstacle sensor, and wherein the safety mode comprises a cruise warning mode of warning a driver of the safety distance between the driver's vehicle and the front-running vehicle, a lane departure warning mode of warning the driver of whether or not the driver's vehicle departs a lane during the traveling of the driver's vehicle, and a dead zone warning mode of warning the driver of not only whether or not an obstacle exists at a side of the vehicle but also the relative speed between the driver's vehicle and another vehicle as the obstacle.

12. The method according to claim 11, wherein the vehicle reference information previously stored in the storage unit comprises a minimum safety distance (dmax) indicating a minimum safety distance between the driver's vehicle and a front-running vehicle, a minimum steering angle (A) for determining whether or not the driver steers the steering wheel, and preset glance light information including color information preset in response to the vehicle sensing information or light outputting period information, and wherein a step of setting the safety mode comprises:
- an inter-vehicle distance-comparing step of comparing the front-running vehicle distance information with the minimum safety distance;
- a steering intention determining step of, if it is determined that the front-running vehicle distance information exceeds the minimum safety distance, comparing a steering angle of the driver's vehicle steering wheel with a minimum steering angle and determining the operational state of a turn indicator of the vehicle; and
- the dead zone obstacle-determining step of, if it is determined that the steering angle of the driver's vehicle steering wheel exceeds the minimum steering angle and the vehicle is steered in the operating direction of the turn indicator in the steering intention determining step, determining whether or not an obstacle exits at a side of the driver's vehicle in the steering direction of the driver's vehicle.

* * * * *